United States Patent
Derks et al.

(10) Patent No.: US 8,336,672 B2
(45) Date of Patent: Dec. 25, 2012

(54) AIR TREATMENT AND SOUND REDUCTION SYSTEM

(75) Inventors: Irvin Lee Derks, Bryan, OH (US); James Lee Austermiller, Defiance, OH (US); Courtney Lee Perkins, Bryan, OH (US)

(73) Assignee: Bard Manufacturing Company, Bryan, OH (US)

( * ) Notice: Subject to any disclaimer, the term of this patent is extended or adjusted under 35 U.S.C. 154(b) by 874 days.

(21) Appl. No.: 11/638,789

(22) Filed: Dec. 14, 2006

(65) Prior Publication Data
US 2009/0020358 A1 Jan. 22, 2009

Related U.S. Application Data

(60) Provisional application No. 60/759,945, filed on Jan. 18, 2006, provisional application No. 60/847,746, filed on Sep. 27, 2006.

(51) Int. Cl.
*F24F 13/24* (2006.01)
*E04F 17/04* (2006.01)
*F24F 13/00* (2006.01)
*F24F 7/06* (2006.01)
*E04F 17/00* (2006.01)

(52) U.S. Cl. ........ 181/224; 181/225; 454/262; 454/346; 454/906

(58) Field of Classification Search .................. 181/224, 181/225, 226; 62/296; 454/262, 206, 346, 454/906
See application file for complete search history.

(56) References Cited

U.S. PATENT DOCUMENTS

| | | | | |
|---|---|---|---|---|
| 1,874,940 A | * | 8/1932 | Dwyer | 165/69 |
| 1,916,908 A | * | 7/1933 | Lewis et al. | 181/224 |
| 2,176,319 A | * | 10/1939 | Anderson | 454/236 |
| 2,270,825 A | * | 1/1942 | Parkinson et al. | 181/224 |
| 2,272,829 A | * | 2/1942 | Bohnsack | 52/145 |
| 2,328,761 A | * | 9/1943 | Wamnes et al. | 454/195 |
| 2,704,504 A | * | 3/1955 | Wilkening | 454/195 |
| 2,724,320 A | * | 11/1955 | Tutt | 454/262 |
| 2,887,856 A | * | 5/1959 | Wile et al. | 62/426 |
| 3,061,056 A | * | 10/1962 | Kodaras | 52/145 |
| 3,112,623 A | * | 12/1963 | Crossman | 62/419 |
| 3,259,178 A | * | 7/1966 | Tarnoff | 165/299 |
| 3,295,273 A | * | 1/1967 | Wehe, Jr. | 52/145 |
| 3,585,919 A | * | 6/1971 | Culpepper, Jr. | 454/253 |

(Continued)

FOREIGN PATENT DOCUMENTS
JP 06202670 A * 7/1994

*Primary Examiner* — Edgardo San Martin
(74) *Attorney, Agent, or Firm* — McDonnell Boehnen Hulbert & Berghoff LLP

(57) ABSTRACT

A device for reducing sound from an air treatment unit includes, in one embodiment, an air treatment system, including a wall mount HVAC unit with a supply air opening and a return air opening. A supply air sound reducer is provided in communication with the supply air. The supply air sound reducer includes a housing defining a supply interior provided with sound reducing material. The sound reducing material is overlaid with a layer of perforated material. A return air sound reducer is provided in communication with the return air opening. The return air sound reducer includes a housing defining an interior return volume provided with sound reducing material applied to one or more inside surfaces of the interior return volume and a layer of perforated material disposed over the sound reducing material. Midstructure including sound reducing material is disposed in each of the supply and return air assemblies.

7 Claims, 18 Drawing Sheets

U.S. PATENT DOCUMENTS

| | | | | |
|---|---|---|---|---|
| 3,789,747 A | * | 2/1974 | Wasserman et al. | 454/186 |
| 3,841,434 A | * | 10/1974 | Culpepper, Jr. | 181/224 |
| 3,963,094 A | * | 6/1976 | Nowikas | 181/198 |
| 4,266,602 A | * | 5/1981 | White et al. | 165/124 |
| 4,287,962 A | * | 9/1981 | Ingard et al. | 181/224 |
| 4,615,411 A | * | 10/1986 | Breitscheidel et al. | 181/224 |
| 4,724,748 A | * | 2/1988 | Geyer | 454/120 |
| 4,956,978 A | * | 9/1990 | Bleck et al. | 62/239 |
| 5,413,530 A | * | 5/1995 | Montaz | 454/262 |
| 5,817,990 A | * | 10/1998 | Furse | 181/224 |
| 5,851,144 A | * | 12/1998 | Nystrom | 454/306 |
| 6,248,014 B1 | * | 6/2001 | Collier | 454/228 |
| 6,342,005 B1 | * | 1/2002 | Daniels et al. | 454/338 |
| 6,370,899 B1 | * | 4/2002 | Hobbs et al. | 62/259.1 |
| 6,402,612 B2 | * | 6/2002 | Akhtar et al. | 454/186 |
| 6,606,876 B1 | * | 8/2003 | Giordano | 62/244 |
| 2009/0133957 A1 | * | 5/2009 | Owens | 181/224 |

* cited by examiner

AIR TREATMENT AND SOUND REDUCTION SYSTEM

This application claims benefit of U.S. Provisional Application No. 60/759,945, filed Jan. 18, 2006 and U.S. Provisional Application No. 60/847,746, filed Sep. 27, 2006.

FIELD OF THE INVENTION

This invention is generally related to sound reduction in air treatment units. In particular, the invention is directed to providing an air treatment unit that includes a system for reducing the sound emitted from the unit. More particularly, the air treatment unit may be a HVAC unit and the sound reduction system includes one or more chambers provided in operative association with the HVAC unit with sound reduction elements for reducing the sound from the HVAC unit. The one or more chamber may be a supply air sound reducer and a return air sound reducer.

BACKGROUND OF THE INVENTION

The use of air treatment units in home, commercial and institutional facilities has been well accepted. These units (hereinafter collectively referred to as HVAC) typically provide heating, ventilation, dehumidification and/or air conditioning to a facility or some combination thereof. Some examples of these air treatment units include, in particular, wall mounted HVAC units. Wall mount air treatment units include most or all of the necessary functional elements to condition and circulate air, and typically include circulating fans, a compressor, air cooling and heating heat exchangers, and filters. These elements of the unit are all typically mounted within or associated with a common housing and may be provided with air intakes and exhausts as well as air supply and air return openings or ducts. The housing is mounted to a wall of a building, typically provided with spaced openings corresponding to the air supply and air return openings of the unit whereby conditioned air may be supplied to one or more rooms of the building via the supply opening and removed therefrom via the return opening.

When HVAC units are attached directly to a building wall and connected to one or more rooms by openings formed through room walls and/or ductwork, a relatively new structure by which air treatment units may be attached to the building to be supplied with conditioned air is referred to as a curb. Historically, curbs have functioned largely as a convenient means by which different sized air treatment units may be adapted to a pre-existing opening in a building.

Some examples of HVAC units with the above configurations are illustrated in detail in U.S. patent application Ser. No. 11/194,807, which is incorporated herein by reference.

One application for wall mount units includes the heating, cooling and ventilation of school facilities and classrooms. Until recently, maximum allowable sound levels for these types of units have been largely unregulated. However, in the late 1990s the Los Angeles Unified School District (LAUSD) issued specifications permitting a maximum of 50 dbA background sound levels in classrooms. Manufacturers of air treatment units have been compelled to contemplate significant and expensive redesign of HVAC units in order to contribute less air treatment noise to the overall sound levels. Recently, some specifications have required a maximum of 45 dbA and, more recently, the American National Standards Institute (ANSI) passed a sound standard for schools setting a maximum sound level of 35 dbA. The Acoustical Society of America, for example, and others are now attempting to get this latest, more stringent limit written into specifications and even legislated in through codes and state standards.

The 35 dbA specification may prove to be a difficult standard to meet, and in some instances may prove to be impossible without a major redesign of existing units and, of course, the costs will ultimately be passed on to consumers (and to taxpayers). Accordingly, there is a demand for wall mount HVAC units that generate and contribute to the schoolroom or any room environment a minimal amount of noise, and which preferably is accomplished without a major and expensive redesign of existing products. The present invention greatly reduces sound levels, in some embodiments to or below the 35 dbA level, and thus satisfies the demand.

SUMMARY OF THE INVENTION

The present invention, in its most general form includes sound reducing elements, which together form a system for reducing the sound associated with operation of an air treatment system.

An air treatment system with sound reducing features includes a HVAC unit, which is attachable to an outside wall of a building. The HVAC unit may be a conventional wall mount air treatment unit. The HVAC unit may include an optional wall curb for attachment to the wall. The wall curb may be a separate enclosure or may be integral to the HVAC unit. In one embodiment, the wall curb includes one or both of return air and supply air plenums. In another embodiment, the wall curb return air and supply air plenums include a layer of sound reduction material for absorbing sound.

One embodiment of the invention provides a chamber in communication with a supply air portion of the air treatment unit. The chamber includes an interior volume provided with a sound absorbing structure, which will be detailed below. The chamber may be connected to conventional ductwork to distribute supply air to a room or rooms of a building. Another embodiment of a supply air sound reducing assembly supplies air without ductwork. As such, and in either case, the chamber functions as a supply air sound reducer to significantly reduce the sound generated through, perceived from, and/or transmitted through the supply air aspect of an air treatment system.

Another embodiment of the invention provides a chamber in communication with a return air portion of the air treatment unit. The chamber includes an interior volume provided with a sound absorbing structure, which will be detailed below. The chamber is provided with an air intake grill opening or the like to receive return air from a room or rooms of a building. The interior of the return air portion of the chamber includes sound reducing structure. The return air portion/chamber may be advantageously positioned in a number of orientations. As such, the chamber functions as a return air sound reducer to significantly reduce the sound generated through, perceived from and/or transmitted through the return air aspect of an air treatment system.

In yet another example, the sound reduction system according to the present invention will include a HVAC unit attachable to a building outside wall. The building will typically have a pair of openings formed therethrough. As is well known in the art a first of the pair of openings may be a supply air opening. The supply air opening permits air treated by the HVAC unit to enter to the interior of the building. A second of the pair of openings may be a return air opening. The return air opening permits the collection of air from the interior of the building, and returns the return air to the HVAC unit for treatment and/or exhaust.

Generally, the system for reducing sound may include a supply air sound reducer, provided in communication with the HVAC unit through the supply air opening. The system also may include a return air sound reducer, provided in communication with the HVAC unit through the return air opening. One or both of the return air sound reducer and the supply air sound reducer may form part of the sound reducing system of the present invention.

The supply air sound reducer, in a more general form includes a housing provided in communication with the supply air opening, and which may be formed of sheet metal or any suitable material. Interior surfaces of the supply air sound reducer housing are provided with a sound reducing structure that will be described in more detail below.

The return air sound reducer, in a more general form includes a housing provided in communication with the return air opening, and which may also be formed of sheet metal or any suitable material. Interior surfaces of the return air sound reducer housing are provided with a sound reducing structure that will be described in more detail below.

Both of the supply air sound reducer and the return air sound reducer are generally a hollow housing with an interior defined by inside surfaces of the sheet material from which they are constructed. Adjacent the inside surfaces of each of the housings is a layer of sound reducing material. The sound reducing material may be one or more of a sound reducing foam material, a sound reducing cotton material, a sound reducing glass insulation material or any suitable material with sound absorbing or reducing qualities. In one embodiment, the sound absorbing material is about from one-half an inch to about three inches in thickness. Adjacent the sound absorbing material and facing the hollow interior of each of the housings is a layer of perforated sheet material. The layer of perforated sheet material may be metal, plastic, composite materials, galvanized metal, aluminum, copper, tin, or any suitable perforated material. The interior of the housing of the return air sound reducer is an open space of about three and one half inches width. A detailed description of the structure of each of the return air sound reducer and supply air sound reducer will be provided in the detailed description of a preferred embodiment of the invention. In both the supply and return air sound reducing devices there is at least one middle panel or intermediary panel of sound reducing structure within the device.

Embodiments of the invention contemplate different combinations of sound reducing elements. One embodiment comprises use of a supply air sound reducer with a conventional air treatment unit. Another contemplates use of a return air sound reducer with a conventional air treatment unit. Yet another contemplates use of both of a supply and return air sound reducer. The air treatment unit may also be a modified or advanced air treatment unit including sound reducing elements of its own, for example, active noise suppression, sound reducing plenums, sound reducing curbs and other suitable mechanisms and methods of reducing sound.

The present invention contemplates a supply air sound reducer for use with an air treatment system, wherein the air treatment system includes a supply air opening and a return air opening, including a housing defining a supply interior. The housing includes a supply base portion and a supply end portion extending from the supply base portion. The supply base portion includes an opening for communication with the air treatment system and receives treated air therefrom. The supply end portion includes an end panel includes one or more supply air opening. A layer of sound reducing material is applied to one or more inside surfaces of the supply interior and a layer of perforated material is disposed over the layer of sound reducing material.

Other aspects of the invention contemplate wherein the supply interior may be generally rectangular in the supply base portion. The supply interior may be generally flared in the supply end portion. The supply base portion may be rectangular. The supply end portion may be flared outwardly from the supply base portion. The supply air opening may be sized and shaped to be connected to and communicate with conventional conduit devices for distributing air in a structure. The housing may include a top supply housing panel and a bottom supply housing panel. The sound reducing material may be disposed on inside surfaces of the top supply housing panel and the bottom supply housing panel. The layer of perforated material may be positioned inboard the layer of sound reducing material and faces the supply interior.

The entire inside surface of the supply interior may be provided with the sound reducing material. The supply air sound reducer may include a mid-structure disposed within the housing. The mid-structure divides the supply interior into a first supply sub-chamber and a second supply sub-chamber. The mid-structure may include a mid-panel disposed with the housing between a top supply housing panel and a bottom supply housing panel of the housing. The supply air sound reducer may further include a layer of sound reducing material disposed on an upper surface of the mid-panel and a layer of sound reducing material disposed on a lower surface of the mid-panel. The supply air sound reducer may further include a layer of perforated material disposed on the layer of sound reducing material. The layer of sound reducing material may include an angled leading edge.

Another embodiment of the invention provides a return air sound reducer for use with an air treatment system, wherein the air treatment system includes a supply air opening and a return air opening, and includes a housing defining an interior return volume. The housing includes a return opening for receiving air from a room in which the return air sound reducer is positioned and a return air opening for communication with the air treatment system. A layer of sound reducing material is applied to one or more inside surfaces of the interior return volume and a layer of perforated material is disposed over the layer of sound reducing material.

Other aspects of the return air sound reducer include wherein the housing may include a front panel and a back panel spaced from the front panel. The housing may be generally rectangular. The return air opening may be formed through the back panel. The layer of sound reducing material may be disposed on both of the front panel and the back panel.

Yet another embodiment provides an air treatment system, including a wall mount HVAC unit with a supply air opening and a return air opening. A supply air sound reducer is provided in communication with the supply air. The supply air sound reducer includes a housing defining a supply interior provided with sound reducing material. The sound reducing material is overlaid with a layer of perforated material. A return air sound reducer is provided in communication with the return air opening. The return air sound reducer includes a housing defining an interior return volume provided with sound reducing material applied to one or more inside surfaces of the interior return volume and a layer of perforated material disposed over the sound reducing material.

Yet another embodiment provides an air treatment system, which includes a wall mount HVAC unit with an integrated sound reduction plenum for reducing noise generated by the operation of the unit and further includes a supply air opening and a return air opening. A supply air sound reducer is provided in communication with the supply air. The supply air sound reducer includes a housing defining a supply interior provided with sound reducing material, the sound reducing material overlaid with a layer of perforated material and a return air sound reducer is provided in communication with the return air opening; the return air sound reducer includes a housing defining an interior return volume, the housing provided with sound reducing material applied to one or more inside surfaces of the interior return volume and a layer of perforated material disposed over the sound reducing material.

These and other features and advantages of the present invention will be further understood upon consideration of the following detailed description of an embodiment of the present invention, taken in conjunction with the accompanying drawings.

DETAILED DESCRIPTION OF EMBODIMENTS OF THE INVENTION

Embodiments of the invention described herein may be used with commercially available HVAC units. For example, the present invention may be used with a wall mount air treatment unit, CH series model, manufactured by Bard Manufacturing Company of Bryan, Ohio, U.S.A. Of course, it will be understood that any suitable air treatment units, and in one embodiment in particular, a wall mount unit, may be used with an embodiment of the present invention. It will be recognized that different sized and shaped air treatment units may require an adjustment of the size and/or shape of the sound reduction system to which the unit will be attached as well as the provision of ductwork or passages to couple the HVAC unit to the sound reduction system and the sound reduction system to the room.

Figure 1:
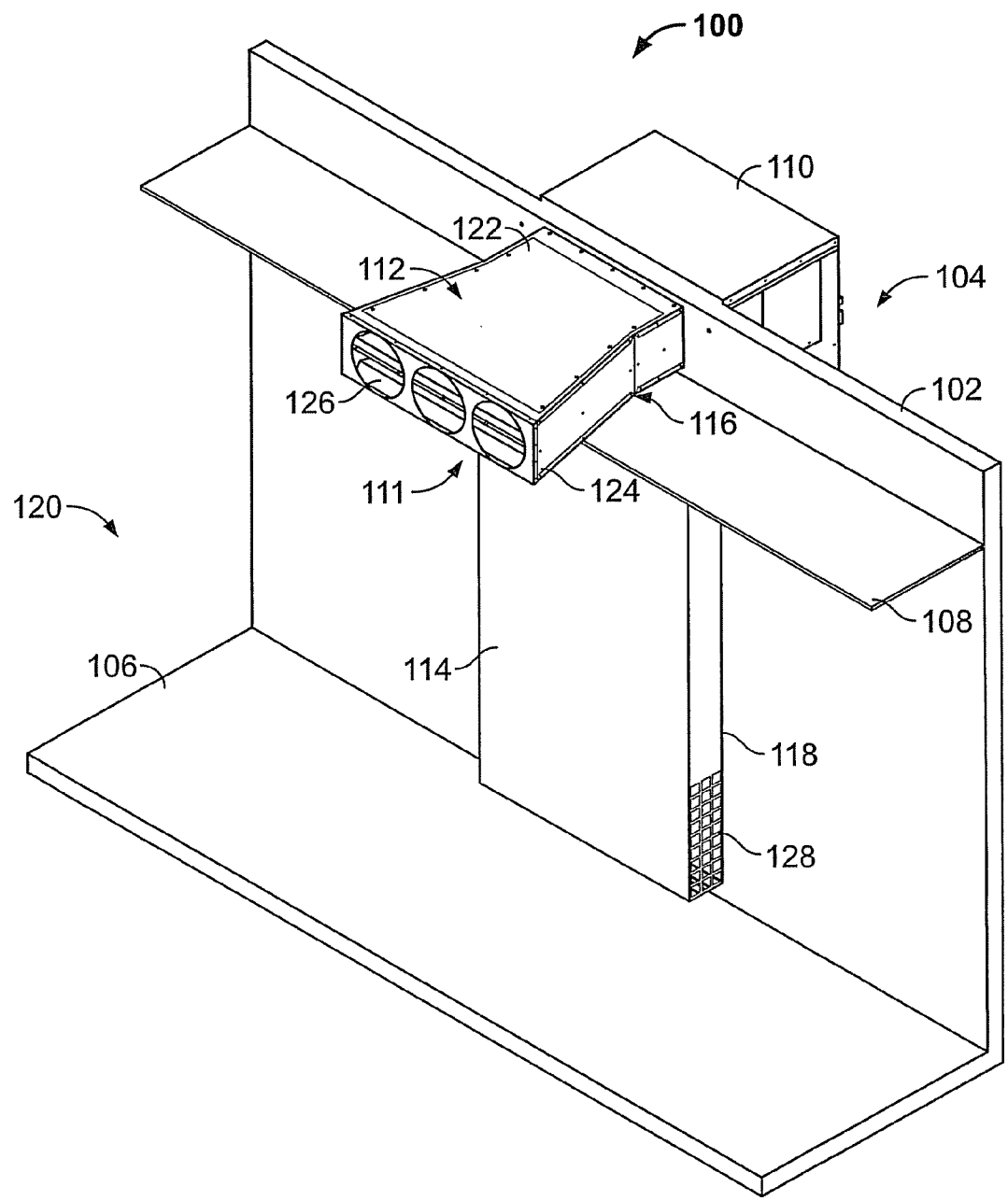
FIG. 1 shows a front perspective view of a HVAC unit and a sound reduction system according to one embodiment of the present invention.
Figure 2:
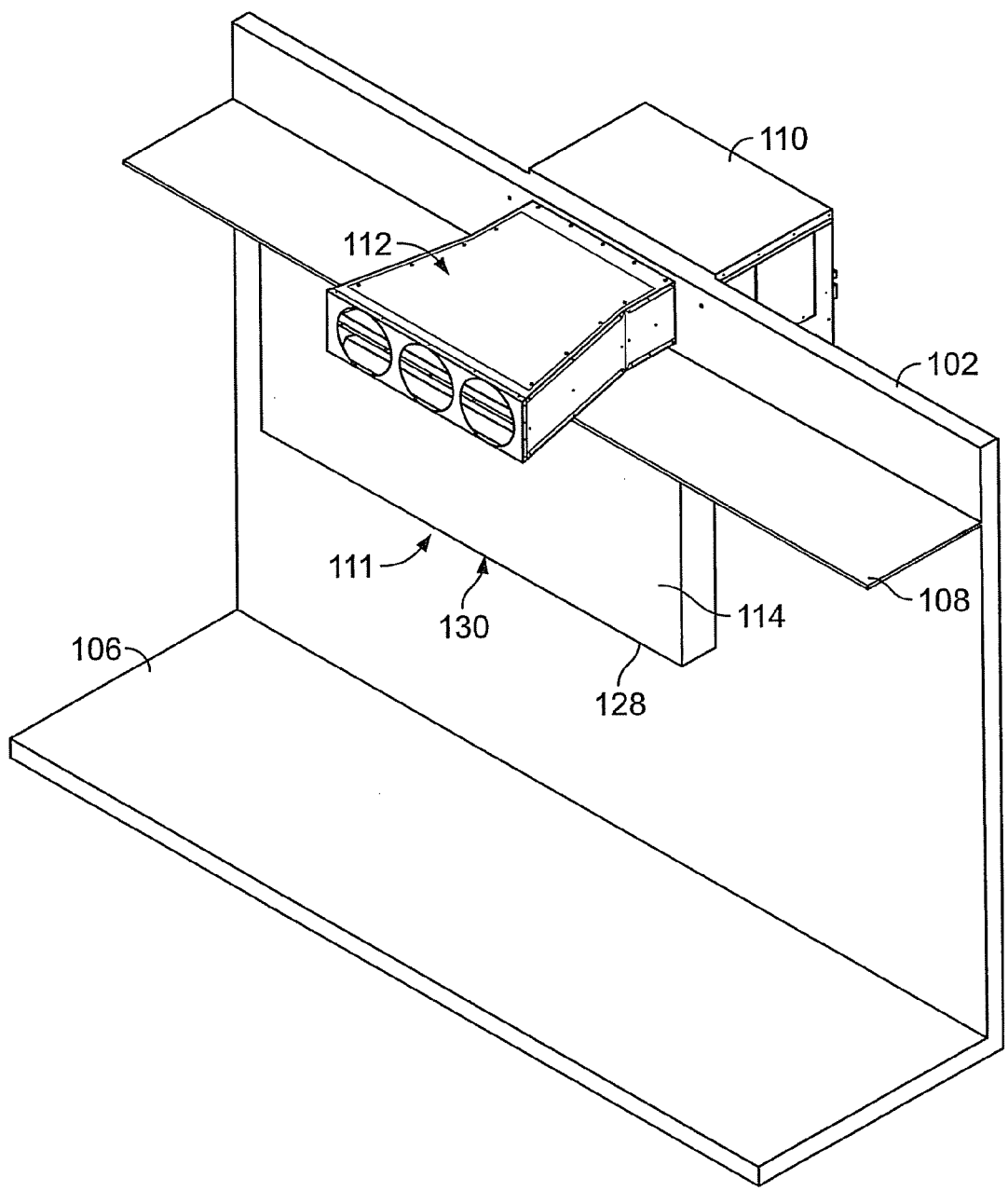
FIG. 2 shows a front perspective view of a HVAC unit and a sound reduction system according to another embodiment of the present invention.
Figure 3:
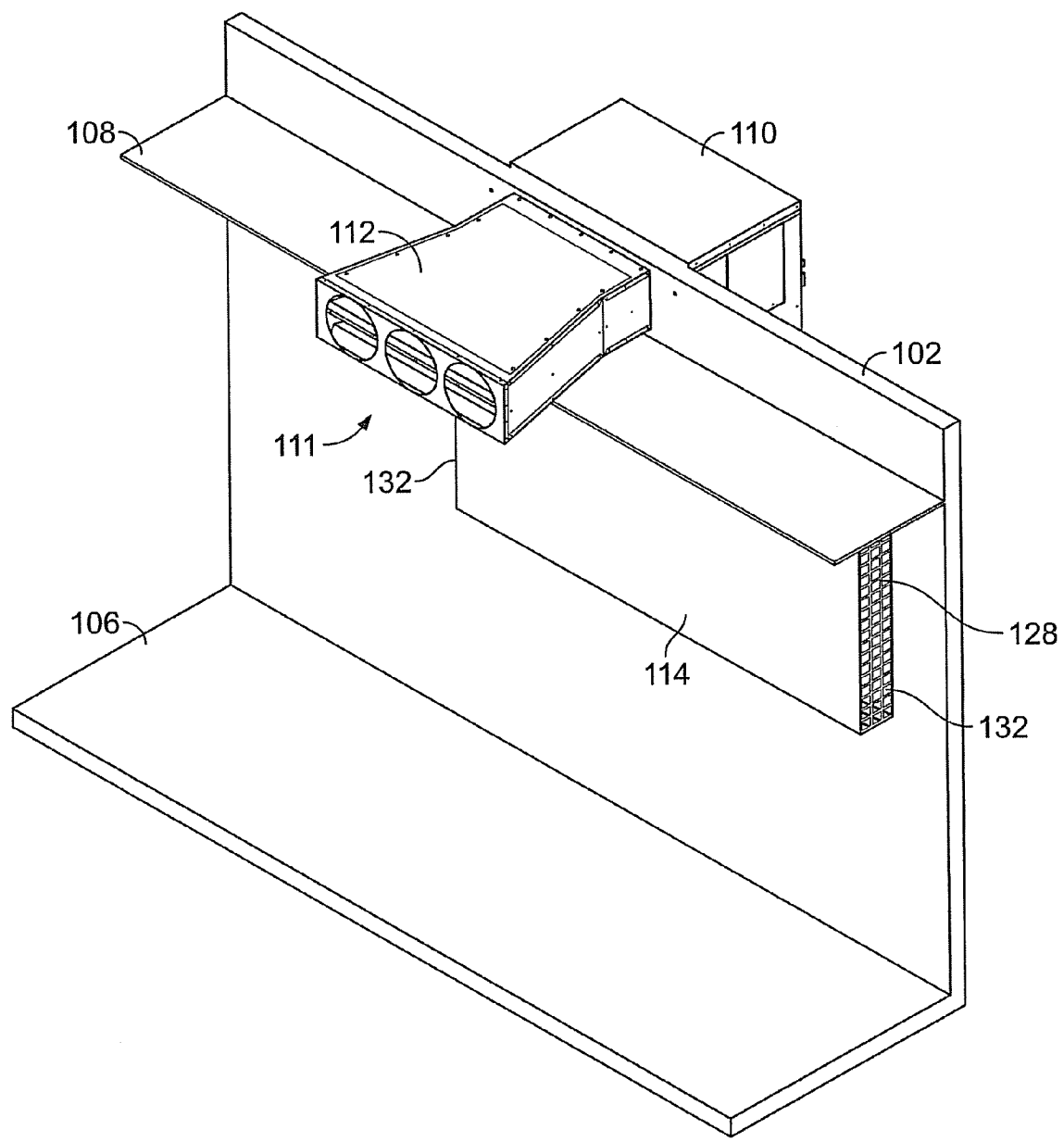
FIG. 3 shows a front perspective view of a HVAC unit and a sound reduction system according to yet another embodiment of the present invention.

Turning to FIGS. 1-3, one embodiment of the system 100 according to the present invention may be provided in an outside wall 102 of a building 104. The building 104 will typically have a pair of openings formed therethrough (not shown). As is well known in the art, a first of the pair of openings may be a supply air opening. The supply air opening permits air treated by the HVAC unit to enter to the interior of the building. A second of the pair of openings may be a return air opening. The return air opening permits the collection of air from the interior of the building, and returns the return air to the HVAC unit for treatment and/or exhaust.

For purposes of orientation and to illustrate an installed embodiment of the invention shown, a building 104 is shown with a vertical outside wall 102. The building 102 includes a floor 106. Near an upper portion of the outside wall 102 is a ceiling 108, which may be a drop ceiling or the like. Attached to the outside wall 102 is a HVAC unit 110, which may be provided with an optional wall curb (not shown) or may include an integral sound reduction plenum.

Generally, the system 100 for reducing sound may include an sound reducer system 111, which may include one or both of a supply air sound reducer 112, provided in communication with the HVAC unit 110 through the supply air opening (not shown) and a return air sound reducer 114, provided in communication with the HVAC unit 110 through the return air opening (not shown).

The supply air sound reducer 112, generally includes a housing 116, provided in communication with supply air from the HVAC unit 110. The supply air sound reducer 112 may be formed of sheet metal or any suitable material. The supply air sound reducer 112 may be positioned on the inside of the building 104 and in an upper portion of the building room 120. As shown in FIG. 1, the supply air sound reducer 112 extends from the inside of wall 102 and is positioned above the ceiling 108.

The presently illustrated embodiment of the supply air sound reducer 112 includes a supply base portion 122, which is essentially rectangular in cross-section. A supply end portion 124 is attached to the supply base portion 122. The supply end portion 124 may flare outwardly from the supply base portion 122. The supply end portion 124 includes one or more supply air opening 126. Supply air collar 126 may be provided with or without air balancing dampers (not shown). Each supply air opening 126 may be sized and shaped to connect to conventional ductwork (not shown) to deliver a supply air throughout the room 120, or throughout more than one room. The interior of the supply air sound reducer housing 116 is provided with a sound reducing structure (see FIG. 7) that will be described in more detail below.

The return air sound reducer 114 generally includes a housing 118 for receiving return air. Air in the room 120 enters the return air sound reducer 114 through a grill 128 or grating. Any suitable opening is contemplated as the grill 128. The grill 128 may be positioned in the number of orientations, and is positioned near a lower end of the return air sound reducer 114.

The housing 118 of the return air sound reducer may be generally rectangular. The interior of the return air sound reducer housing 118 is provided with a sound reducing structure that will be described in more detail below (see FIG. 5). The return air sound reducer 114 may also be formed of sheet metal or any suitable material.

FIG. 1 shows an embodiment of the return air sound reducer 114 including an elongated rectangular shape, which is oriented generally vertically. As will be shown below, the grating 128 receives air from the room 120, the air travels generally upwardly through the return air sound reducer 114 to a position near the upper end of the return air sound reducer, through the wall 102, and into the HVAC unit 110. Other orientations of the return air sound reducer 114 are contemplated by the invention. For example, FIG. 2 shows a return air sound reducer 114 in a generally horizontal configuration. In this configuration, the grill 128 may extend along the bottom panel 130 of the return air sound reducer 114. Yet another configuration of the return air sound reducer 114 is shown in FIG. 3. In this configuration the grill 128 extends along one or both of the sides 132 of the return air sound reducer 114.

Figure 4:
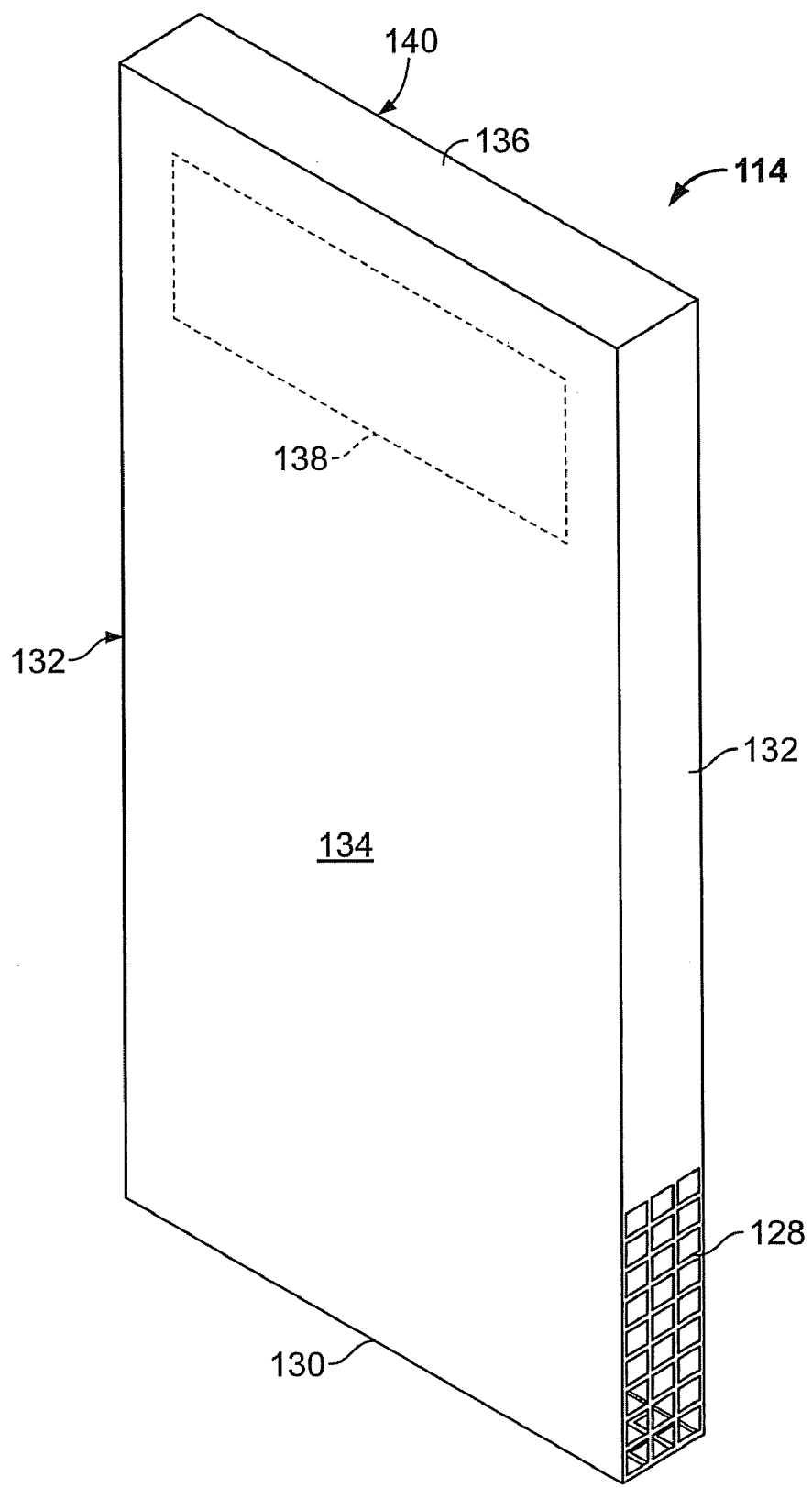
FIG. 4 shows a front perspective view of a return air sound reducer of the sound reduction system according to an embodiment of the present invention.

FIG. 4 shows an embodiment of the return air sound reducer 114 shown in position in a building as illustrated in FIG. 1. It will be understood that some embodiments of the invention contemplate use of the return air sound reducer 114 with an air treatment system without other sound reducing elements. The return air sound reducer 114 has the front panel 134, which faces the inside of the room 120 (see FIG. 1). The return air sound reducer includes a lower panel 130 and a pair of side panels 132. Return air sound reducer also includes a top panel 136. Grill 128 extends along a minor portion of sides 132, and some or all of bottom panel 130. A return air opening 138 is formed in a back panel 140 of the return air sound reducer 114 in an end opposite grill 128.

Figure 5:
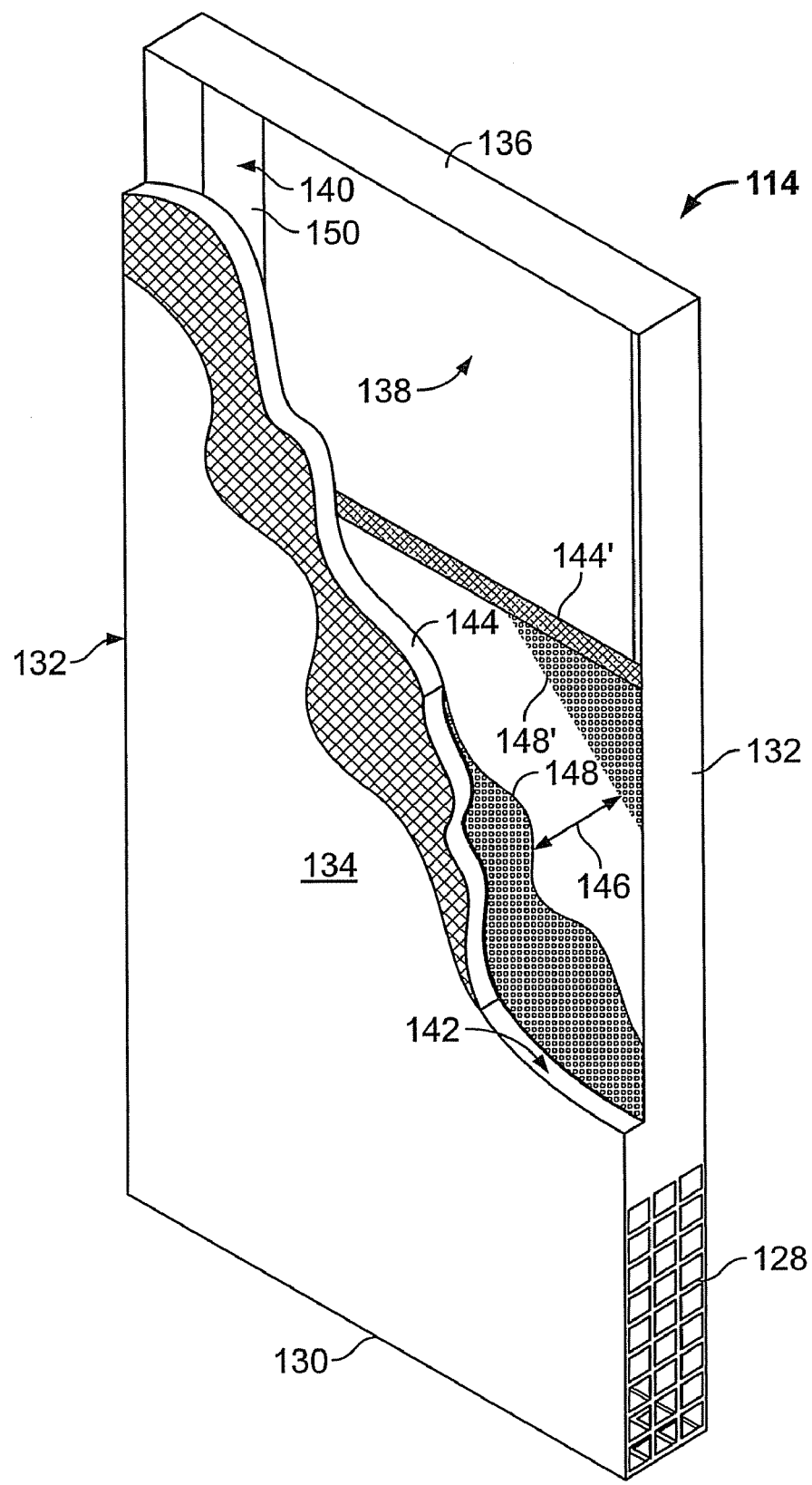
FIG. 5 shows a partial cutaway perspective view of the return air sound reducer of FIG. 4.

FIG. 5 shows the return air sound reducer 114 of FIG. 4, wherein like parts are labeled with like reference characters. The front panel 134 and back panel 140 are spaced apart to define an interior return volume 146. The front panel 134 includes a front panel inside surface 142, adjacent which is provided a layer of sound absorbing material 144. The sound absorbing material 144 may be any suitable material as disclosed above, and having a depth of about 1 inch to about 3 inches and preferably about 2 inches. Inboard of the sound absorbing material 144 and facing the interior return volume 146 is a thin layer or sheet of perforated material 148. The layer of perforated material 148 functions at least to hold the sound absorbing material in place against the front panel inside surface 142.

Similarly, back panel 140 includes a back panel inside surface 150, adjacent which is provided a layer of sound absorbing material 144'. The sound absorbing material 144' may be any suitable material as disclosed above, and having a depth of about 1 inches to about 3 inches and preferably about 2 inches. Inboard of the sound absorbing material 144' and facing the interior return volume 146 is a thin layer or sheet of perforated material 148'. The layer of perforated material 148' functions at least to hold the sound absorbing material in place against the back panel inside surface 150. The interior return volume 146 may be from about 2 inches to about 6 inches in depth and preferably about 3 inches in depth.

The back panel 140 includes a return air opening 138 that permits air entering return interior volume 146 through grill 128, to be drawn into the unit 110 (see FIG. 1). The sound-absorbing material 144, 144' may be, for example, fiberglass insulation, an elastomeric material, a textured material, sound absorbing foam, cotton, batting or any suitable material having sound deadening or absorbing properties or properties which reduce sound energy. A preferred material is RA35 fiberglass insulation manufactured by Owens Corning.

Figure 6:
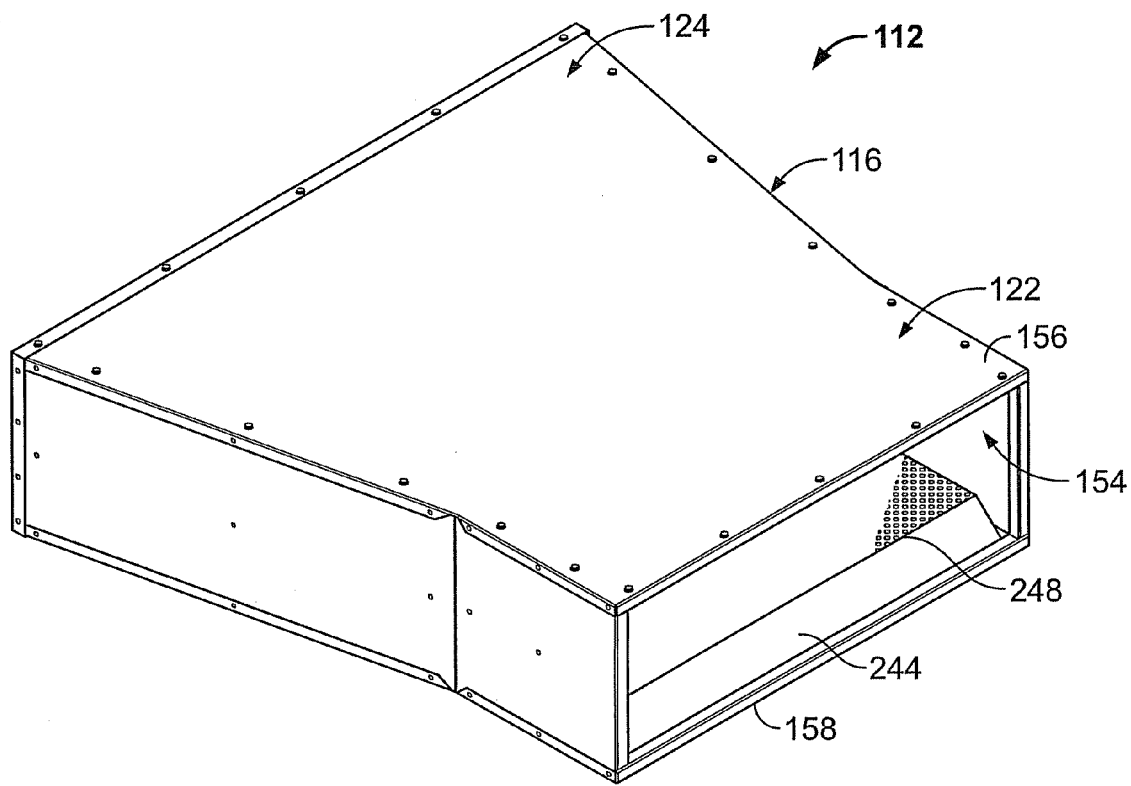
FIG. 6 shows a rear perspective view of a supply air sound reducer of the sound reduction system according to an embodiment of the present invention.

FIG. 6 shows the supply air sound reducer 112. It will be understood that some embodiments of the invention contemplate use of the supply air sound reducer 112 with an air treatment system without other sound reducing elements. The supply air sound reducer 112 generally includes a housing 116, which may be formed of sheet metal and is provided in communication with supply air from the HVAC unit 110 (see FIG. 1). The supply air sound reducer 112 includes a supply base portion 122, which is a subsection of the housing and not necessarily a separate element, and is essentially rectangular in cross section. A supply end portion 124 is attached to the supply base portion 122 and not necessarily a separate element. In an alternate embodiment, the supply base portion 124 could be a separate component attached to the supply base portion 122.

The supply end portion 124 may flare outwardly from the supply base portion 122. The housing 116 defines a supply interior 154 at least in part with a top supply housing panel 156 spaced from a bottom supply housing panel 158. A layer of sound absorbing material 244 is disposed on an inside surface of the bottom supply housing panel 158. A sheet of perforated material 248 is disposed inboard from the layer of sound-absorbing material 244. An identical layer of sound-absorbing material and sheet of perforated material is disposed on the inside surface of the top supply housing panel 156.

Figure 7:
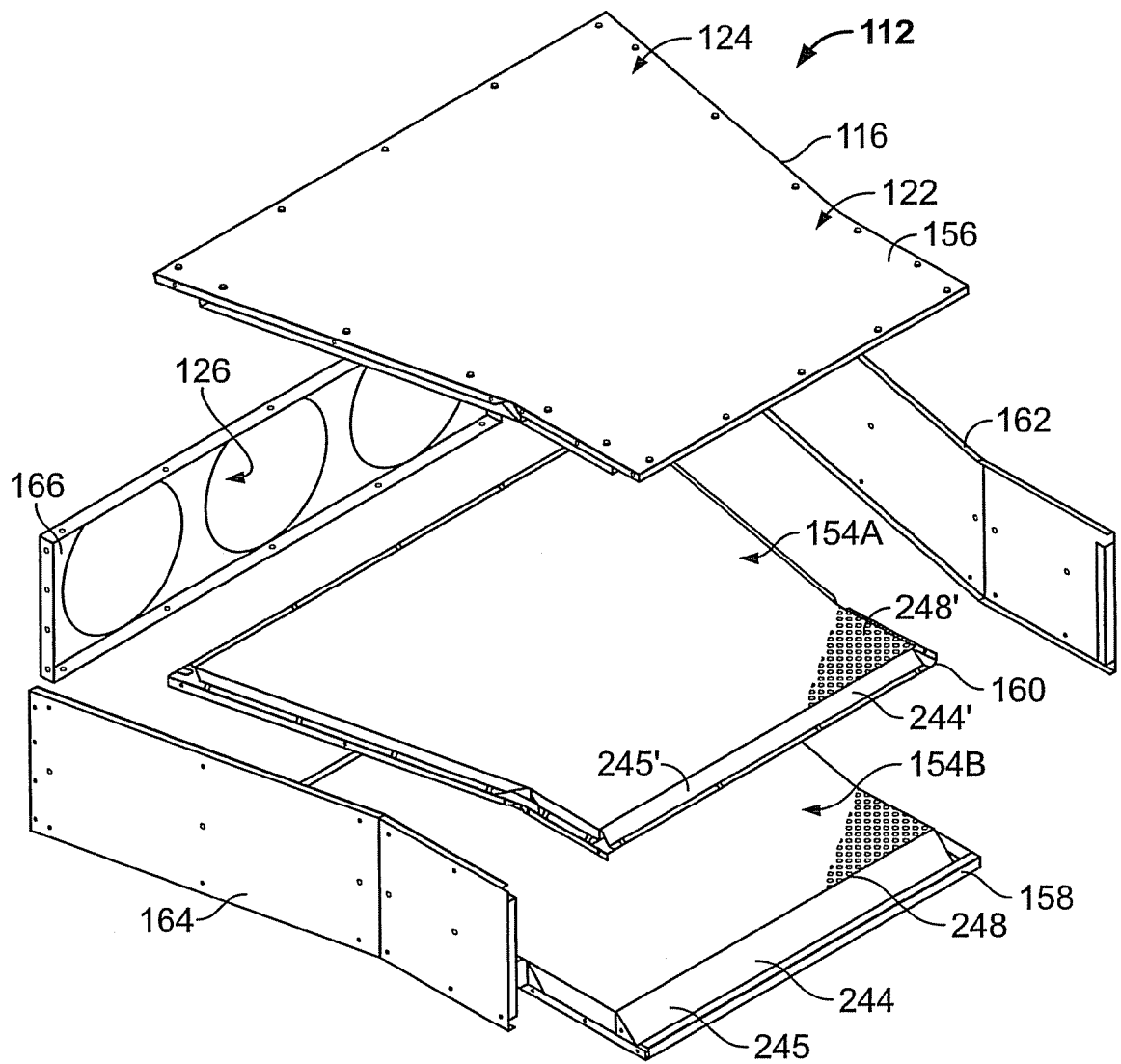
FIG. 7 shows an exploded perspective view of another embodiment of a supply air sound reducer.
Figure 8:
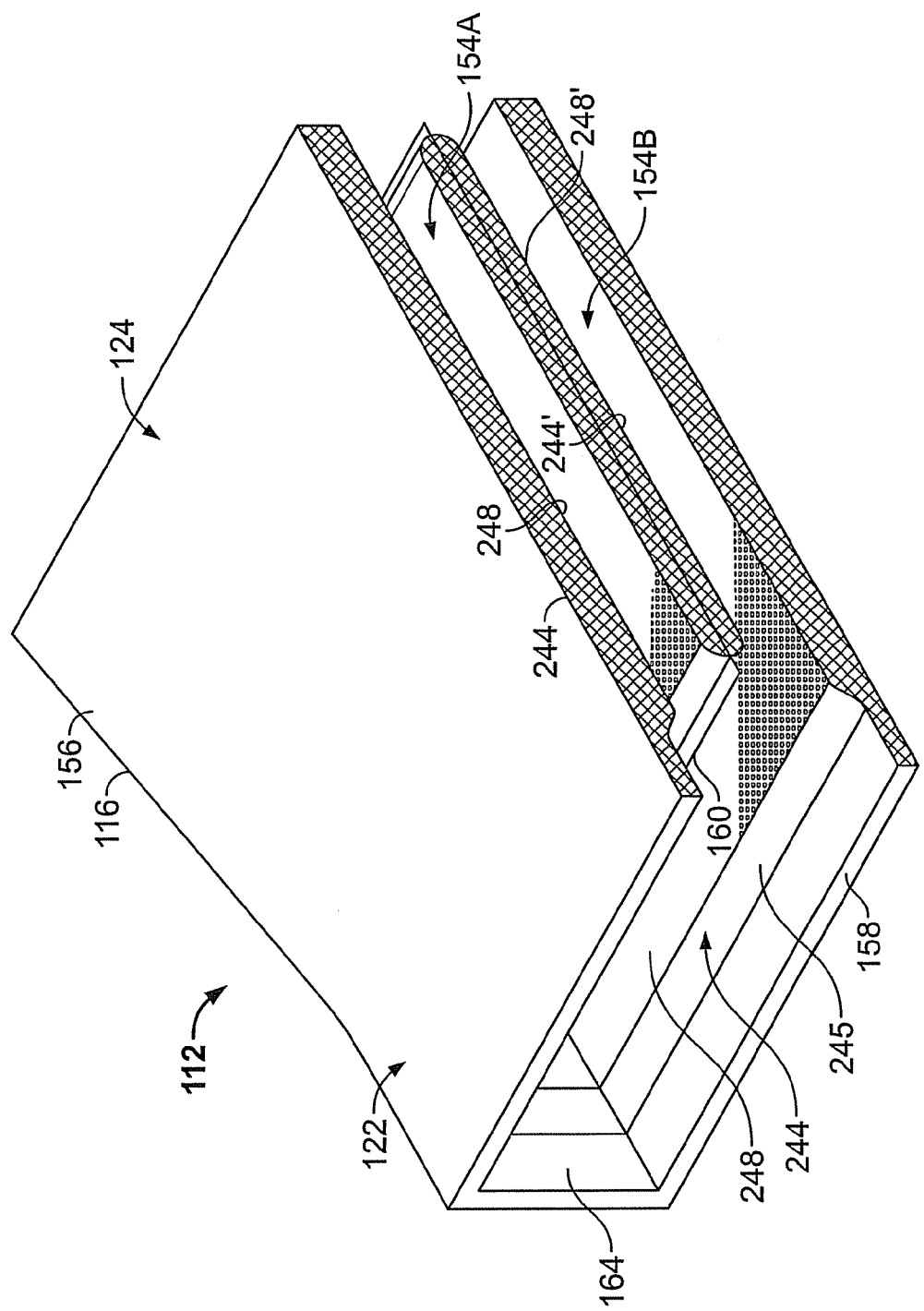
FIG. 8 shows a cross sectional view of the reducer of FIG. 7.

Turning to FIGS. 7 and 8, the interior of another embodiment of the supply air sound reducer housing 116 is provided with an additional sound reducing mid-structure 160. It will be understood that some embodiments of the invention contemplate use of the supply air sound reducer 112 with an air treatment system without other sound reducing elements.

The supply air sound reducer 112 generally includes a housing 116, which may be formed of sheet metal and is provided in communication with supply air from the HVAC unit 110 (see FIG. 1). The housing 116 with the mid-structure 160 defines a dual-chamber supply interior 154A, 154B at least in part with a top supply housing panel 156 spaced from a bottom supply housing panel 158. A layer of sound absorbing material 244 is disposed on an inside surface of the bottom supply housing panel 158. The sound absorbing material 244 includes an angled leading edge 245. The leading edge 245 may be angled or curved and is believed to reduce turbulence or standing waves and thus, enhance the reduction of noise or sound.

A sheet of perforated material 248 is disposed Inboard from the layer of sound-absorbing material 244. An identical layer of sound-absorbing material 244 and sheet of perforated material 248 is disposed on the inside surface of the top supply housing panel 156.

The mid-structure 160 includes a similar sound reducing structure as provided the top and bottom supply housing panels 156, 158. A layer of sound absorbing material 244' is attached to top and bottom surfaces of the mid-structure 160, which is formed of a sheet panel similar in construction and overall shape to the top and bottom supply housing panels 156, 158. The layer of sound absorbing material 244' also preferably includes and angled or curved leading edge 245'.

The housing 116 is bracketed by a first side 162 and a second side 164 which extend between the top and bottom supply housing panels 156, 158 and from a supply base portion 122, which is a subsection of the housing and not necessarily a separate element, and is essentially rectangular in overall shape and a supply end portion 124 attached to the supply base portion 122. The supply end portion 124 may flare outwardly from the supply base portion 122. An end panel 166 closed the supply end portion 124 and includes one or more supply air opening 126 which may be sized and shaped to receive a conventional cylindrical duct for delivering supply air from the supply air sound reducer 112 to a room or rooms. It is believed that the flaring shape of the supply air sound reducer 112 advantageously permits the velocity of supply air to be reduced while passing therethrough, which may contribute to the reduction of sound.

Figure 9:
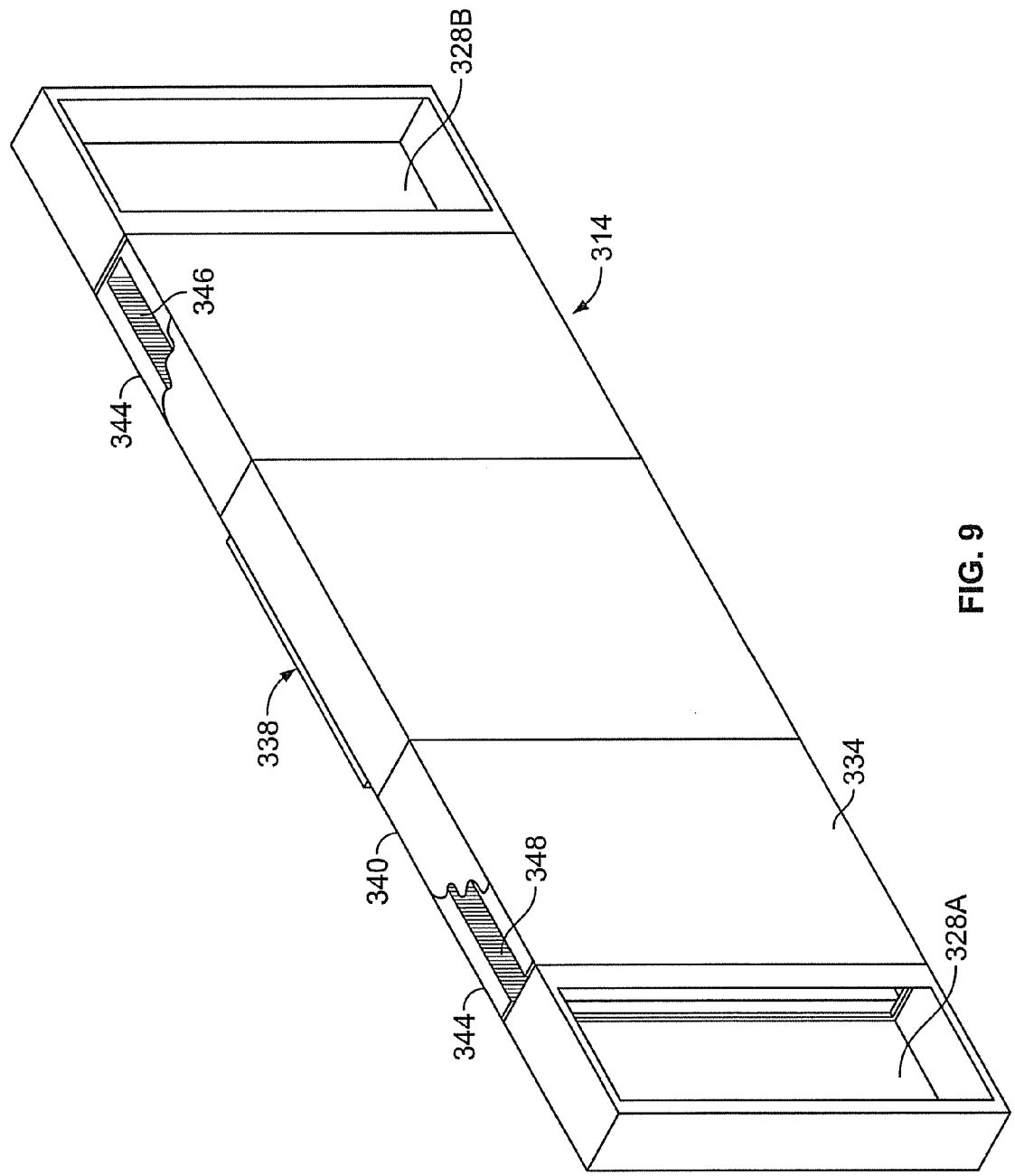
FIG. 9 shows an alternate embodiment of a return air sound reducer with dual intakes.
Figure 10:
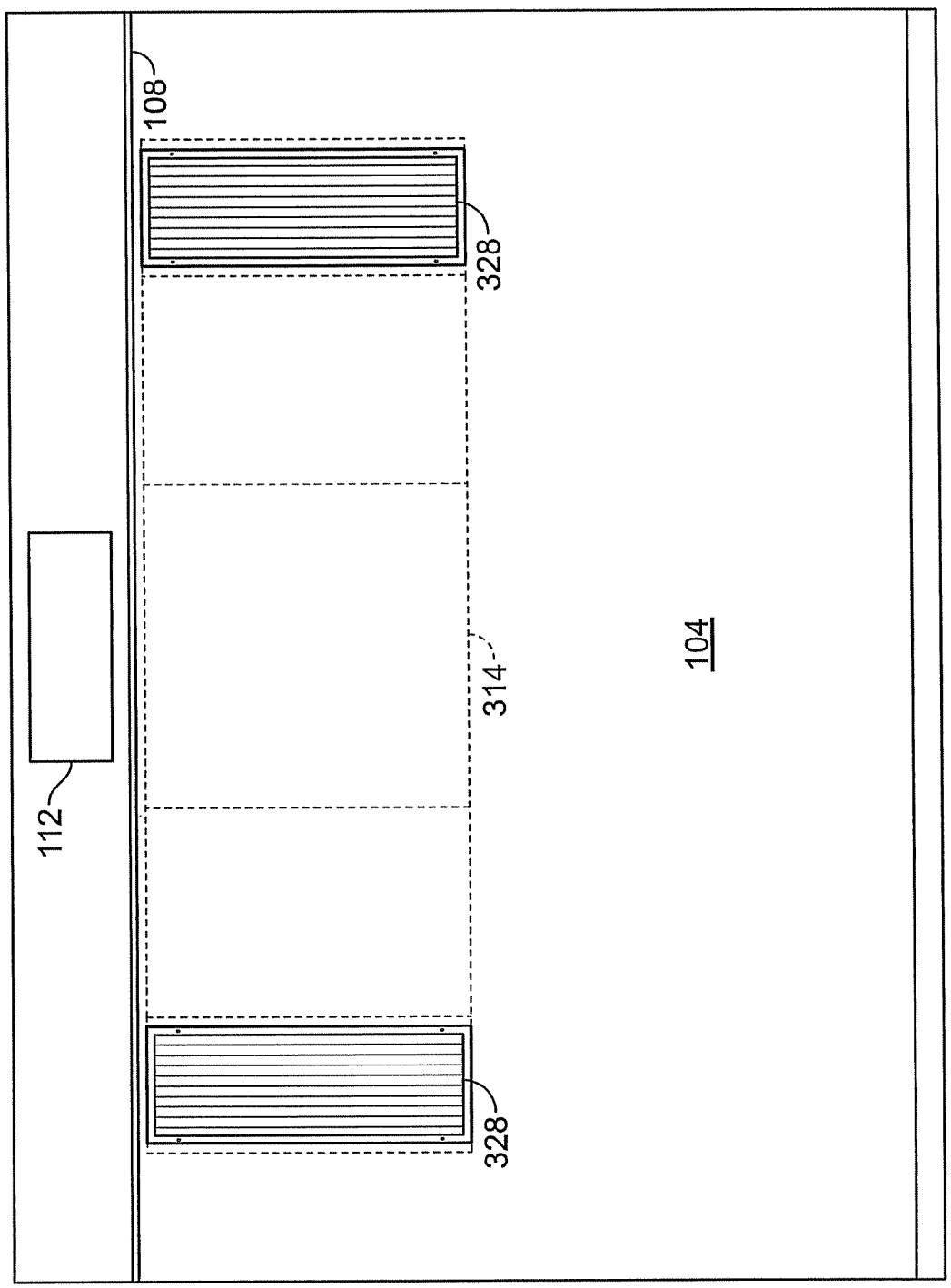
FIG. 10 shows the embodiment of the return air sound reducer of FIG. 9 installed in a building.
Figure 11:
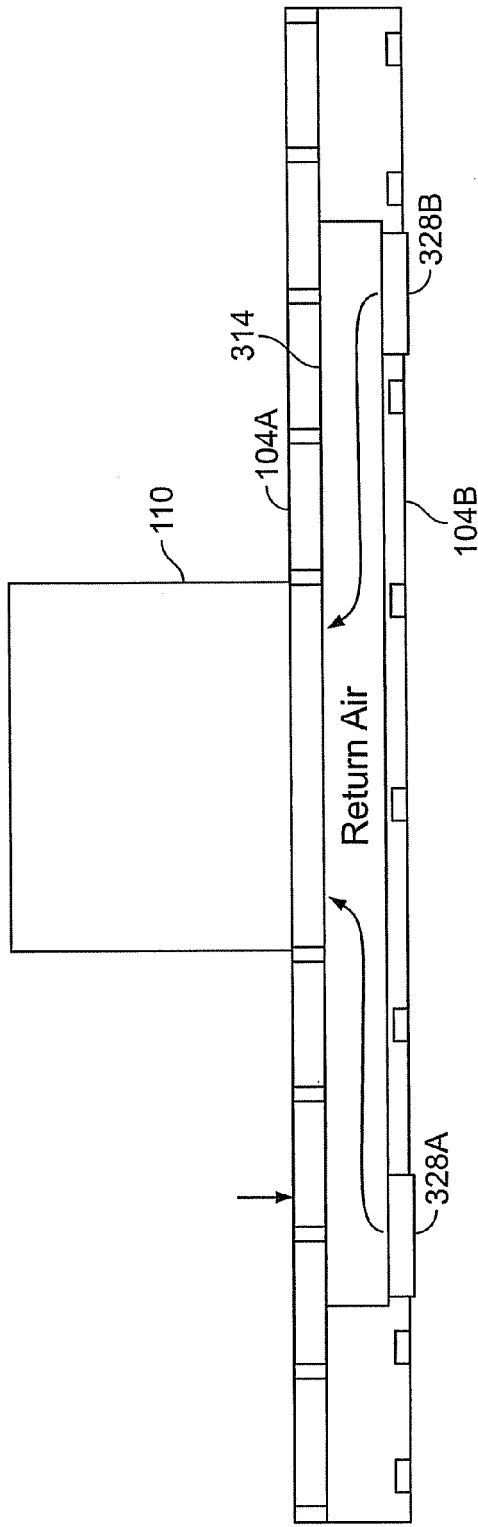
FIG. 11 shows an overhead cutaway view of the installation of the reducer of FIG. 9 in the interior structure of a wall.

FIGS. 9-11 show another embodiment of a return air sound reducer 314 positioned on wall 104 under ceiling 108 and centered under supply air sound reducer 112. The return air sound reducer 314 includes front panel 334 and back panel 340, which are spaced apart to define an interior return volume 346. Similar to previously described embodiments, a layer of sound absorbing material 344 is provided to at least the inside surfaces of the front and back panels 334, 340. Inboard of the sound absorbing material 344 and facing the interior return volume 346 is a thin layer or sheet of perforated material 348.

The back panel 340 includes a return air opening 338 that permits air entering return interior volume 346 through grills 328 and through openings 328A, 328B. The grill openings 328A, 328B are horizontally spaced apart at opposite ends of the return air sound reducer.

Referring to FIG. 11, the return air sound reducer 314 may be imbedded in the cavity formed between an outer wall 104A and an inner wall 104B. Return air is drawn into the return air sound reducer 314 through left and right return grill openings 328A, 328B and through outer wall 104A into the air treatment unit 110.

Figure 13:
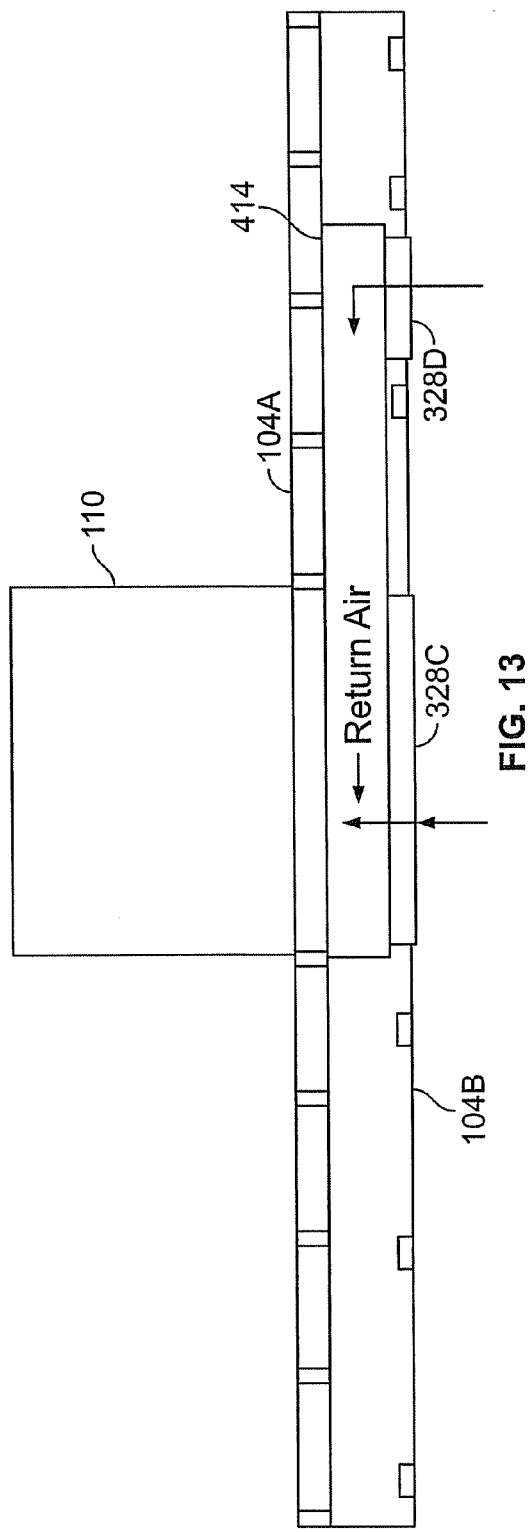
FIG. 13 shows an overhead cutaway view of the installation of the reducer of FIG. 12.
Figure 12:
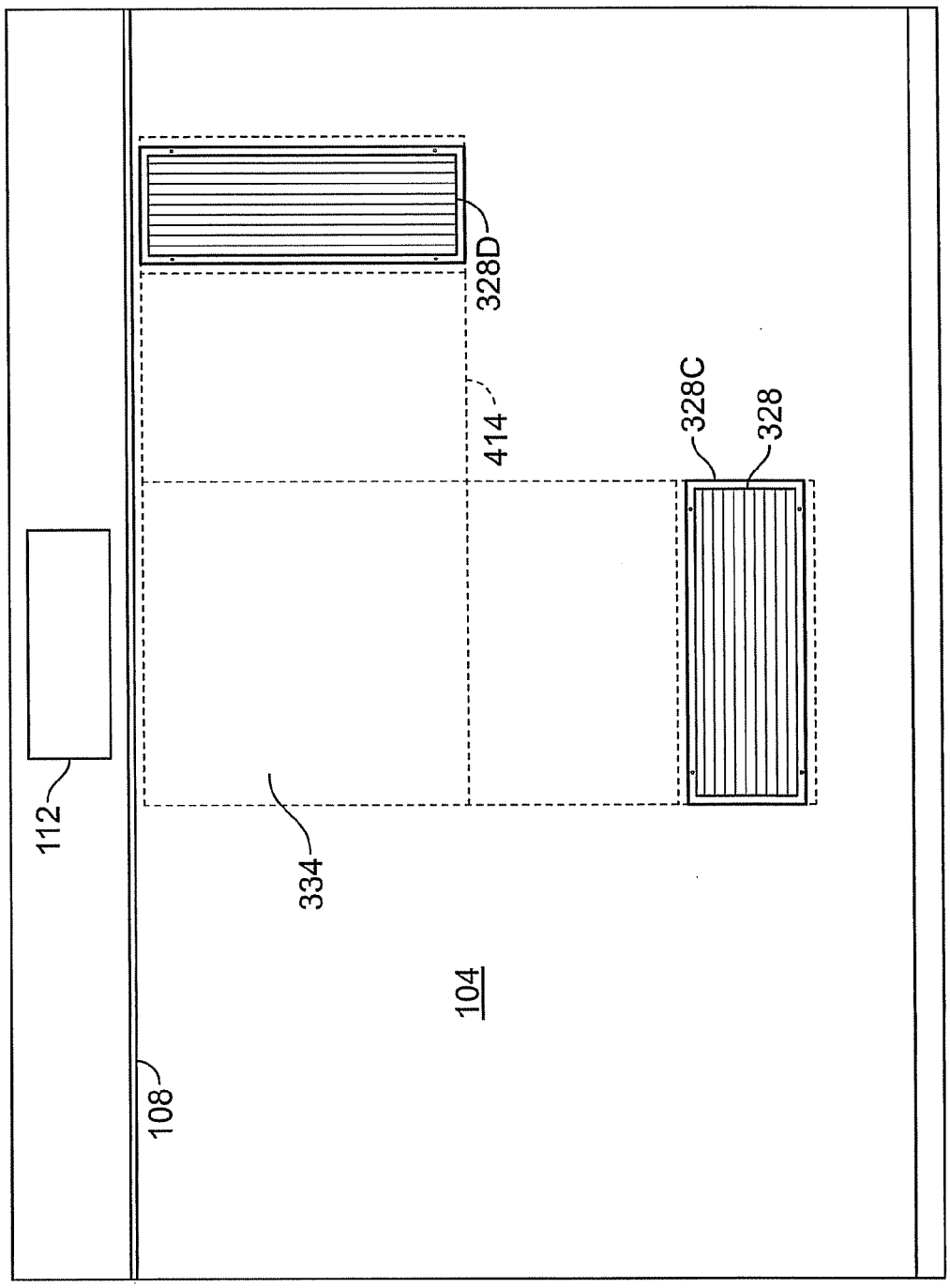
FIG. 12 shows yet another alternate embodiment of a return air sound reducer with dual intakes installed in a building.

FIGS. 12-13 show yet another embodiment of a return air sound reducer 414 positioned on wall 104 under ceiling 108 and centered under supply air sound reducer 112. The grill openings 328C, 328D are positioned at a lowed part and a side part of the supply air sound reducer respectively.

Referring to FIG. 13, the return air sound reducer 414 may be imbedded in the cavity formed between an outer wall 104A and an inner wall 104B. Return air is drawn into the return air sound reducer 414 through lower and side return grill openings 328C, 328D and through outer wall 104A into the air treatment unit 110.

Figure 14:
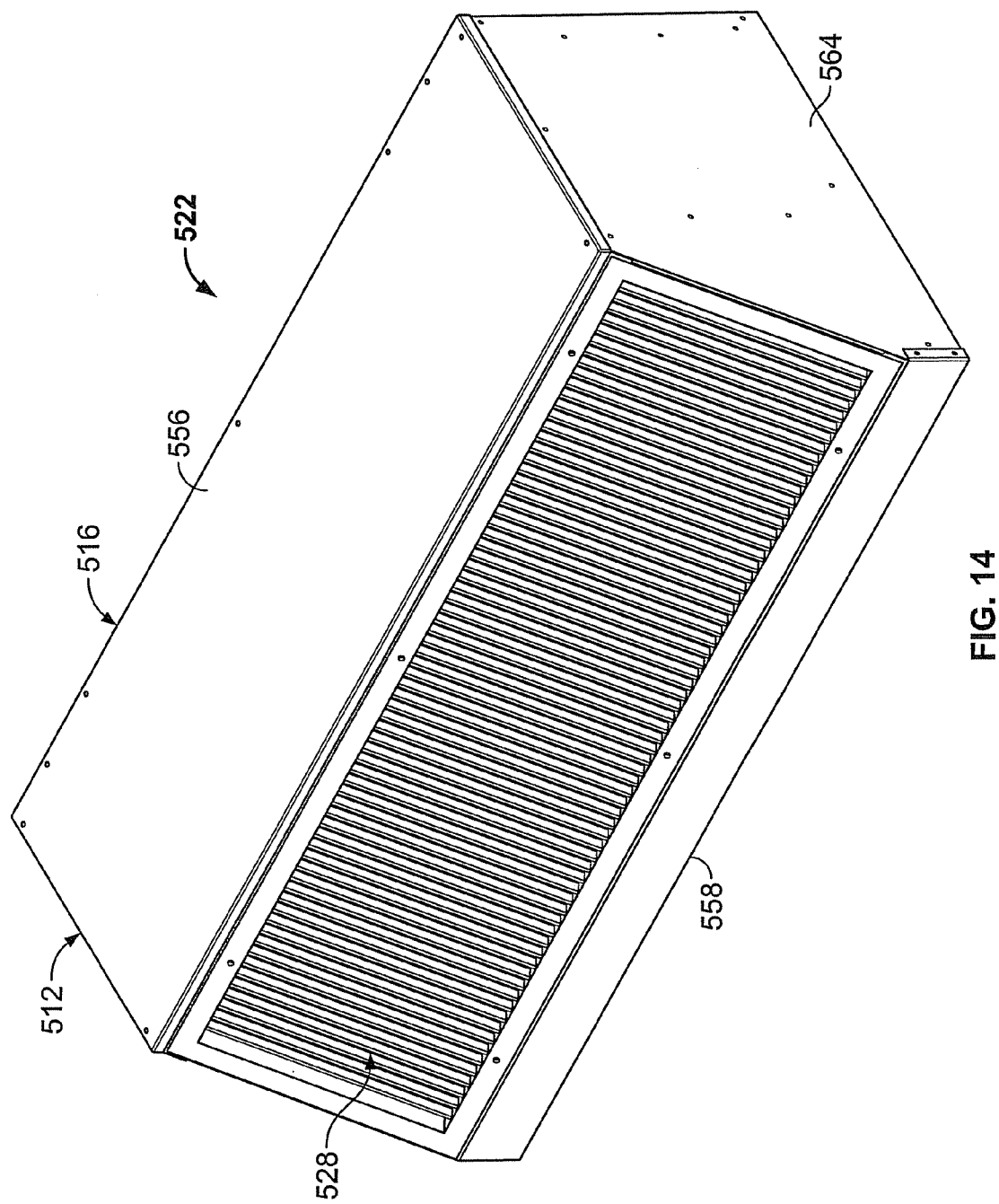
FIG. 14 shows yet another embodiment of a supply air sound reducer.
Figure 15:
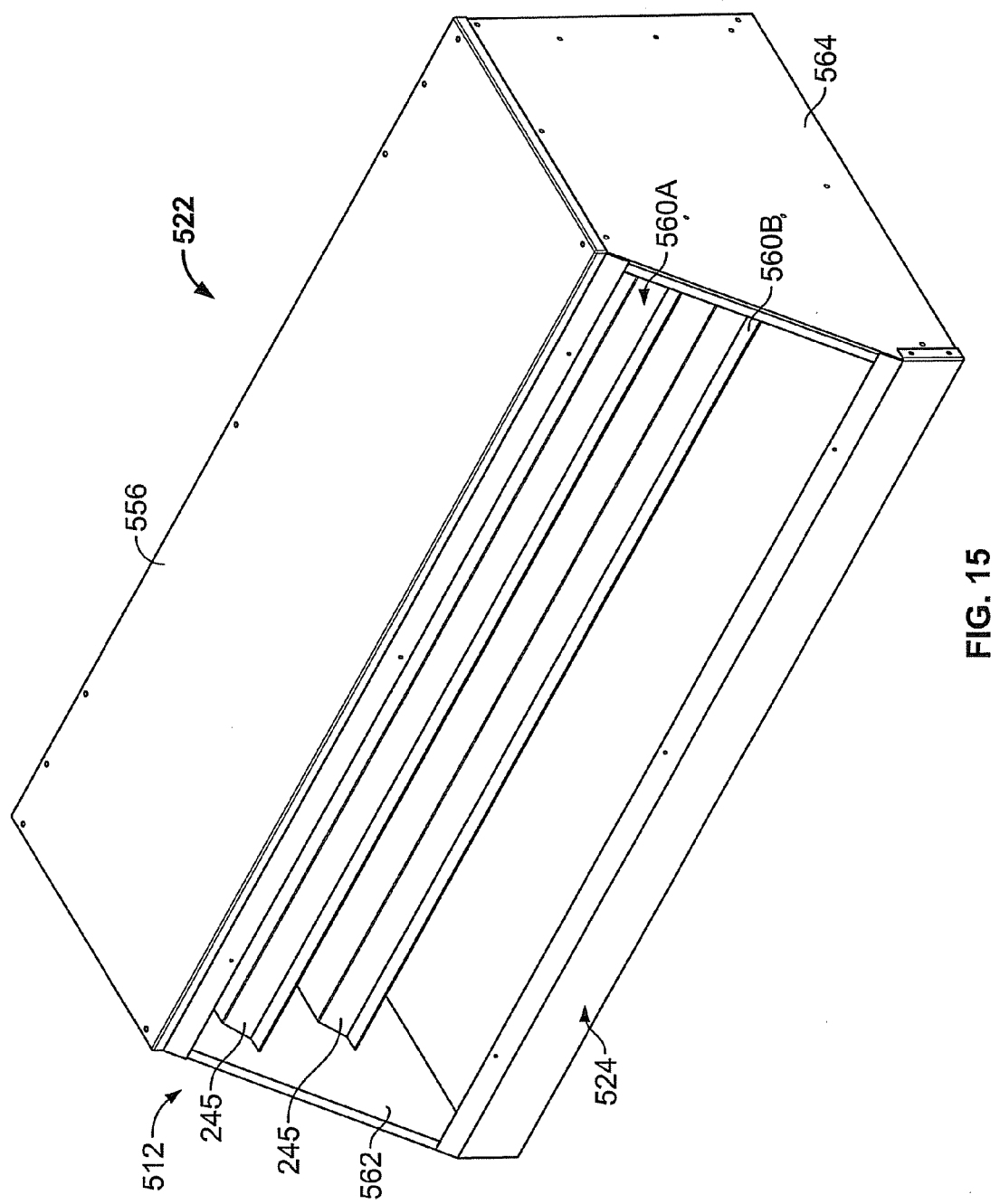
FIG. 15 shows the supply air sound reducer of FIG. 14 with the grill removed.
Figure 16:
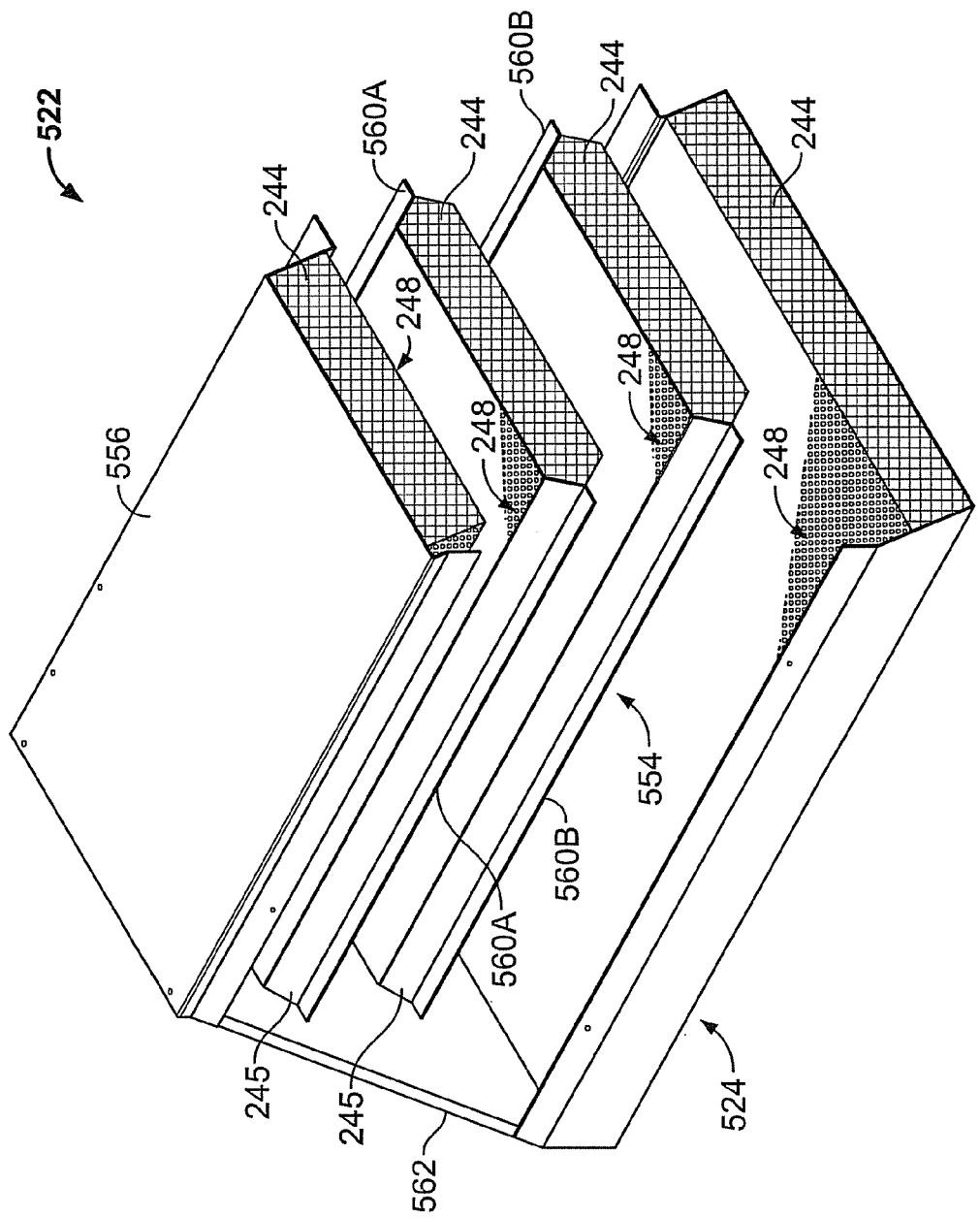
FIG. 16 shows the supply air sound reducer of FIG. 14 in cross section.

FIGS. 14-16 show another embodiment of a supply air sound reducer 512. The supply air sound reducer 512 includes a housing 516 including a first and second side panel 562, 564. A bottom supply housing panel 558 and top supply housing panel span between the first and second side panel 562, 564. A grill 528 is positioned at the supply end portion 524 opposite the supply back portion 522. A pair of sound reducing mid-structures 560A, 560B is positioned in the interior of the housing 516. Each of the leading and trailing edges of the pair of sound reducing mid-structures 560A, 560B include an angled edge 245.

The inside of the bottom supply housing panel 558 includes a layer of sound reducing material 244 which is overlaid by a layer of perforated material 248 as described above. Similarly, the inside of the top supply housing panel 556 includes a layer of sound reducing material 244 which is overlaid by a layer of perforated material 248. Both upper and lower surfaces of the pair of sound reducing mid-structures 560A, 560B include a layer of sound reducing material 244 which is overlaid by a layer of perforated material 248. As air travels through the supply interior 554, sound is absorbed in the layers sound reducing material 244 and perforated material 248.

Figure 17:
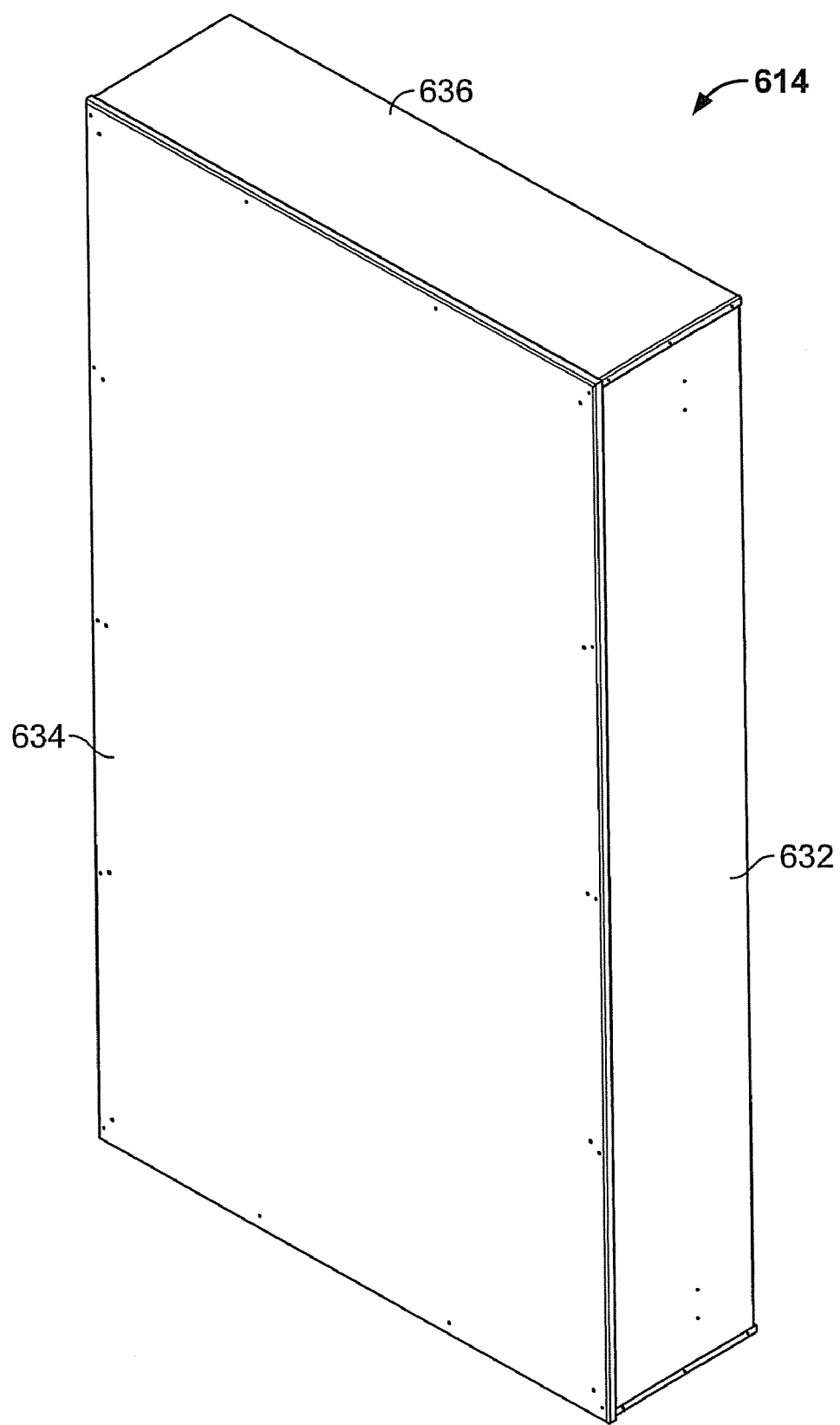
FIG. 17 shows a front perspective view of a return air sound reducer according to yet another embodiment of the invention.
Figure 18:
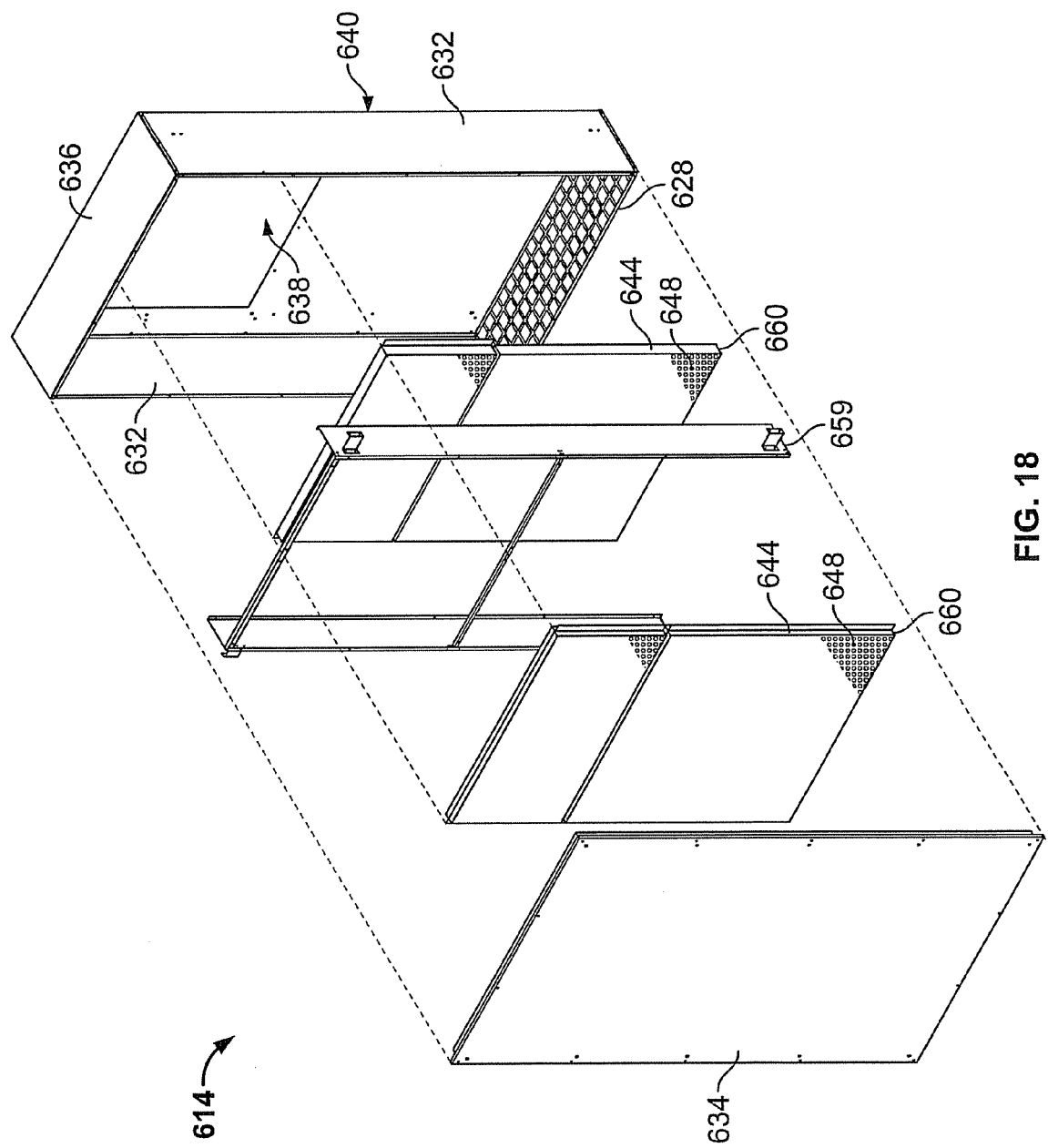
FIG. 18 shows an expanded view of the return air sound reducer of FIG. 17.
Figure 19:
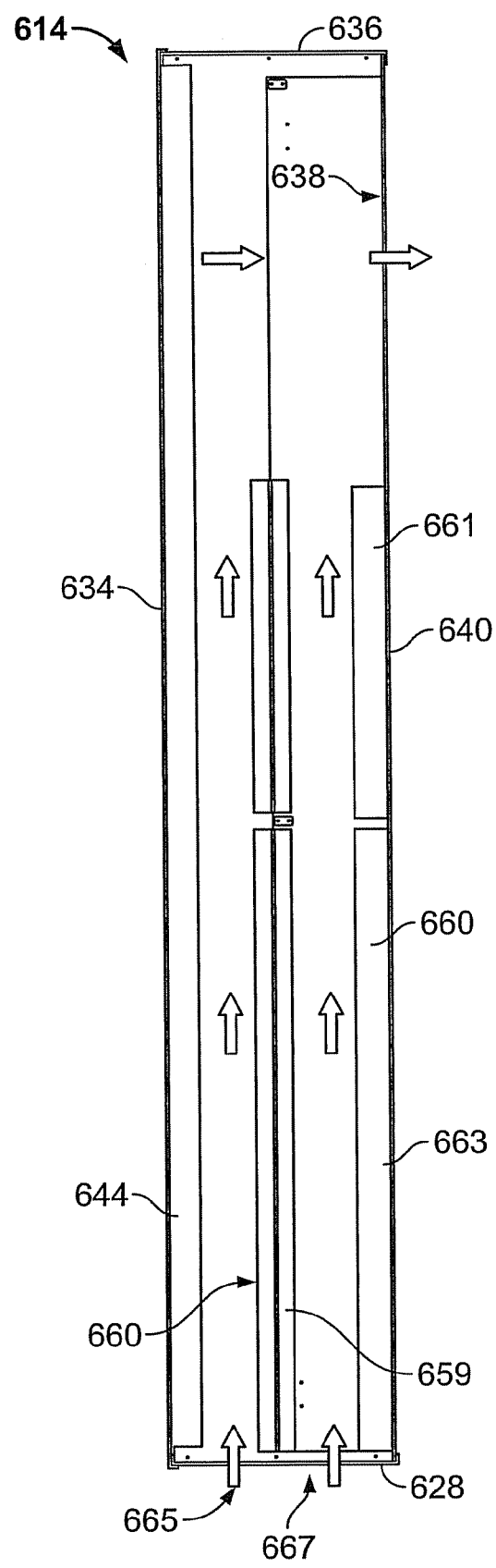
FIG. 19 shows air flow through the return air sound reducer of FIG. 17.

FIGS. 17-19 show a return air sound reducer 614 according to yet another embodiment of the invention. The return air sound reducer 614 has a sound reducing mid-structure supported by a mid-frame member 659. The return air sound reducer 614 shown includes a back housing 640, formed of side panels 632, a top panel 636 and a grill 628 at the bottom of the back housing. The return air sound reducer 614 may be oriented a variety of suitable configurations, including vertically, as depicted or rotated in a more horizontal configuration.

Both the mid-frame member 659 and the back housing 640 include a return air opening 638. The return air sound reducer 614 is closed by a front panel 634. A mid-frame member 659 is positioned between the front panel 634 and the back housing 640 and includes fastened thereto a pair of sound reducing structures 660. One of the sound reducing structures 660 is positioned thereby against the inside of the back housing 640 and the other structure 660 is positioned between the front panel 634 and back housing panel 640.

A further panel of sound reducing material 660 is positioned on the inside surface of the front panel 634. Each of the sound reducing structures 660 includes an internal layer of sound reducing material 644 sandwiched between layers of perforated material 648 as above. The sound reducing structure 660 adjacent the back housing 640 can be divided into a lower sound reducing structure portion 663 and an upper sound reducing structure portion 661. The upper sound reducing structure portion 661 is rectangular and can be arranged either horizontally or vertically (shown horizontally) to change the shape of the opening 638 in the back housing panel 640. The mid-frame member 659 and structures 660 divide the interior of the return air sound reducer into first and second return air passageways 665, 667 in communication with the grill 628 and return air opening 638.

While the present invention has been described and illustrated with reference to specific embodiments, those skilled in the art will recognize that modifications and variations may be made without departing from the principles of the present invention as described hereinabove and set forth in the following claims. It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

What is claimed is:

1. A return air sound reducer for use with an air treatment system, wherein the air treatment system includes an air blower and actively moves air therethrough and is mounted outside of an exterior outdoor wall to a structure and includes a supply air opening and a return air opening, comprising:
    a housing mounted on the inside of the wall and defining an interior return volume, said housing including a return opening for receiving air from a room in which the return air sound reducer extends, return air being conveyed through said interior return volume to the air treatment system;
    a layer of sound reducing material applied to one or more inside surfaces defining said interior return volume; and
    a layer of perforated material disposed over said layer of sound reducing material.

2. The return air sound reducer of claim 1, wherein said housing includes a front panel and a back panel spaced from said front panel.

3. The return air sound reducer of claim 2, wherein said housing is generally rectangular.

4. The return air sound reducer of claim 3, wherein said return air opening is formed through said back panel.

5. The return air sound reducer of claim 2, wherein said layer of sound reducing material is disposed on both of said front panel and said back panel.

6. An air treatment system, comprising:
a wall mount HVAC unit including a supply air opening and a return air opening, said wall mount HVAC unit being mounted outside of an outdoor wall of a structure and actively moving air therethrough;
a supply air sound reducer being mounted on the inside of the wall and being in communication with said supply air opening, said supply air sound reducer including a housing defining a supply interior provided with sound reducing material, said sound reducing material overlaid with a layer of perforated material; and
a return air sound reducer in communication with said return air opening;
said return air sound reducer including a housing being mounted on the inside of the wall and defining an interior return volume, said housing provided with sound reducing material applied to one or more inside surfaces of said interior return volume and a layer of perforated material disposed over said sound reducing material.

7. An air treatment system, comprising:
a wall mount HVAC unit, said wall mount HVAC unit having a blower and being mounted on the outside of an outdoor wall, said wall mount HVAC unit including an integrated sound reduction plenum for reducing noise generated by the operation of the unit and further including a supply air opening and a return air opening;
a supply air sound reducer being mounted on the inside of the wall and being in communication with said supply air, said supply air sound reducer including a supply housing defining a supply interior provided with sound reducing material over one or more inside surfaces of said supply housing interior, said sound reducing material being overlaid with a layer of perforated material; and
a return air sound reducer in communication with said return air opening;
said return air sound reducer including a return housing being mounted on the inside of the wall and defining an interior return volume, said return housing being provided with sound reducing material over one or more inside surfaces of said return interior housing, and a layer of perforated material disposed over said sound reducing material.

* * * * *